United States Patent
Freadman

(10) Patent No.: US 6,546,262 B1
(45) Date of Patent: Apr. 8, 2003

(54) CELLULAR TELEPHONE ACCESSORY DEVICE FOR A PERSONAL COMPUTER SYSTEM

(75) Inventor: Tommyca Freadman, Campbell Hall, NY (US)

(73) Assignee: Altec Lansing Technologies, Inc., Milford, PA (US)

( * ) Notice: Subject to any disclaimer, the term of this patent is extended or adjusted under 35 U.S.C. 154(b) by 249 days.

(21) Appl. No.: 09/711,601

(22) Filed: Nov. 13, 2000

Related U.S. Application Data

(60) Provisional application No. 60/165,315, filed on Nov. 12, 1999.

(51) Int. Cl.[7] .................................................. H04B 1/38
(52) U.S. Cl. ........................................ 455/557; 455/413
(58) Field of Search ................................ 455/556, 557, 455/566, 412, 413, 415

(56) References Cited

U.S. PATENT DOCUMENTS 6,308,062 B1 * 10/2001 Chien et al. ................ 455/420
6,463,299 B1 * 10/2002 Macor ........................ 455/556

* cited by examiner

*Primary Examiner*—Lee Nguyen
*Assistant Examiner*—Earl Moorman
(74) *Attorney, Agent, or Firm*—Eugene C. Rzucidlo

(57) ABSTRACT

A communications device for interfacing a computer to a cellular telephone which includes memory, voicemail, caller identification and a display screen includes a housing accessible to a human operator, a telephone interface attached to the housing to communicatively connect to the cellular telephone, a telephone connection to connect to a telephone line; and means for uploading the voicemail of the cellular telephone via the telephone connection and telephone interface to the memory of the cellular telephone. Attaching the cellular telephone to the telephone interface actuates the uploading of the voicemail of the cellular telephone to the memory of the cellular telephone for display in the display screen of the cellular telephone.

16 Claims, 3 Drawing Sheets

CELLULAR TELEPHONE ACCESSORY DEVICE FOR A PERSONAL COMPUTER SYSTEM

RELATED U.S. APPLICATION DATA

This application claims priority from U.S. Provisional Application No. 60/165,315, "Cellular Telephone Accessory Device for a Personal Computer System", filed Nov. 12, 1999 by Tommyca Freadman, incorporated herein by reference.

FIELD OF THE INVENTION

This invention relates generally to the input and output of data from a computer, particularly, computers having the ability to send and receive data from a cellular telephone.

BACKGROUND OF THE INVENTION

Personal computers and cellular telephones have become indispensable tools for managing one's affairs in the contemporary business environment. Cellular telephones, because they are mobile, allow the user to send and receive phone calls from anywhere within the range of a cellular transmission tower. This greatly facilitates communication since parties are no longer tied to desk phones or pay phones. Contemporary cellular phones support many features to optimize their use, such as internal memory to support voicemail and email, and synchronization interfaces so that they may be connected to a computer. A list of callers and the contents of voicemail or email messages may be displayed in the phone's display screen, and a typical phone possesses buttons that allow the user to scroll through a list and select a number or person to call. Many phones will also support a task list of reminders for the user that may be displayed in the display screen. Because of the limited number of keys on a phone, the user will usually enter this information on a personal computer and then download it to the cellular phone via the synchronization connection. However, the memory on the cellular phone is limited, and this in turn limits the amount of information that may be downloaded to the phone, as well as the length of the voicemail or email messages it may store. The synchronization of data between cellular phones and personal computers is well known in the art. One type of synchronization is the HotSync technology by 3Com.

The above methods of entering information to the cellular phone require keyboard entry by the user. An easier method would be for the user to talk directly to the phone, and have the phone interpret the speaker's words. Cellular phones, however, do not currently possess the computing power to recognize speech and convert the audio signal to text. On the other hand, such software technology is available for personal computers and is well known in the art. Furthermore, computers possess the memory for maintaining lists with more information, such as lists of incoming phone calls along with messages of essentially unlimited length, and detailed task lists.

Thus, there is a need for a method and a system to integrate a cellular telephone with a personal computer so that the computer can handle the memory-intensive and computational-intensive tasks that the phone cannot handle, and for the computer and phone to interact and communicate with each other so that the phone may access the data stored on the computer and the user may control the phone by voice.

SUMMARY OF THE INVENTION

The present invention is directed to an apparatus that satisfies the need to easily manage the functionality of a cellular telephone by means of a personal computer. In particular, the present invention is directed to an interface apparatus to which a cellular telephone may be attached so that it may communicate with the apparatus and a host computer. The invention is also directed to a means for a cellular telephone attached to the interface to perform as a speakerphone. One feature of the invention is a means and apparatus for maintaining a list of incoming phone calls, including the name and number of the caller, the time of the call, any message left by the caller, and a means for automatically displaying this list on the cellular telephone and replaying the messages. Another feature is a means for the attached cellular phone to display the number and caller of an incoming non-cellular phone call. Additional features of the present invention include means for the automatic dialing of outgoing calls, managing conference calls, and the maintenance of a task list. The invention also includes speech recognition means for voice control of the apparatus and of selecting outgoing phone calls and maintaining a task list.

DETAILED DESCRIPTION OF THE INVENTION

The accessory device of the present invention is connected to a computer and comprises a housing for enclosing and supporting internal elements. These elements include: (1) a microprocessor for interfacing the accessory device to the host computer; (2) a software program resident in the host computer for managing the functions of the accessory device, and for recognizing and acting on voice commands and voice data input; (3) a bidirectional interface device to which a cellular telephone may be attached; (4) various input means to input commands into the accessory device to control various functions, including recording messages, replaying messages, playing messages at a future date, saving messages, displaying the phone list, conference calls, displaying the task list, and replicating the functions of a telephone keypad; (5) a pointer device for choosing and selecting options performed in conjunction with the computer; (6) an audio input device for a user to input audio information to the accessory device; (7) an audio output device for a user to receive audio information from the accessory device; and (8) a means for connecting to a phone line. In a preferred embodiment of the invention, the connection to the computer is by means of a universal serial bus (USB) cable, although other types of connection, such as an RS 232 serial connection, a parallel connection, or a wireless connection, are of course possible. The USB connection is a preferred connection because it permits peripherals to be plugged in and unplugged without turning the system off, and because it distributes 500 mamps of power through the port. Thus, a low-power device that would otherwise require its own power connection can be powered through the USB connection. This invention is intended for use with a cellular telephone with an interface to an external device, and preferably whose user subscribes to a caller identification service such as Caller ID.

Figure 1:
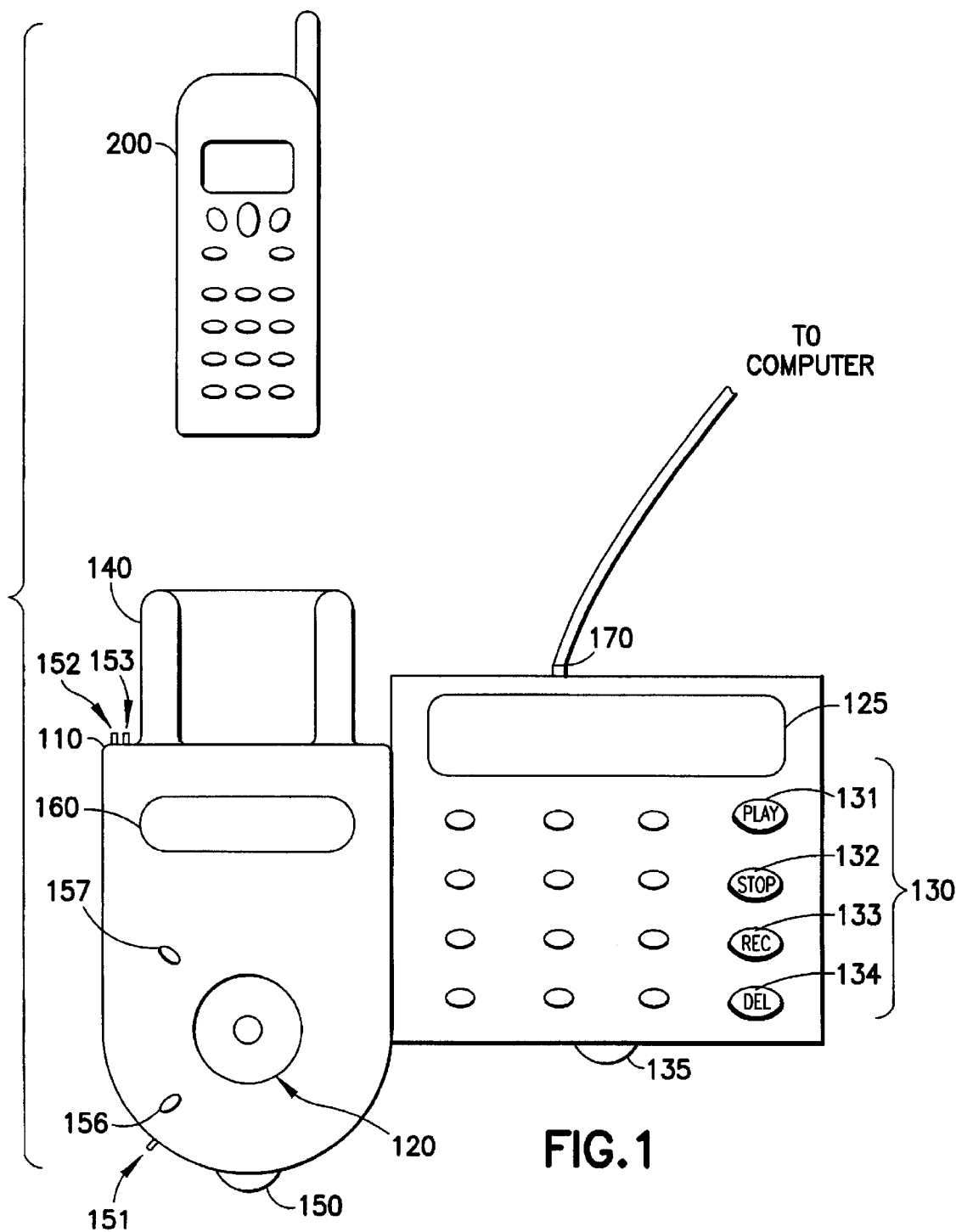
FIG. 1 shows a view of one embodiment of the accessory device of the present invention.
Figure 2:
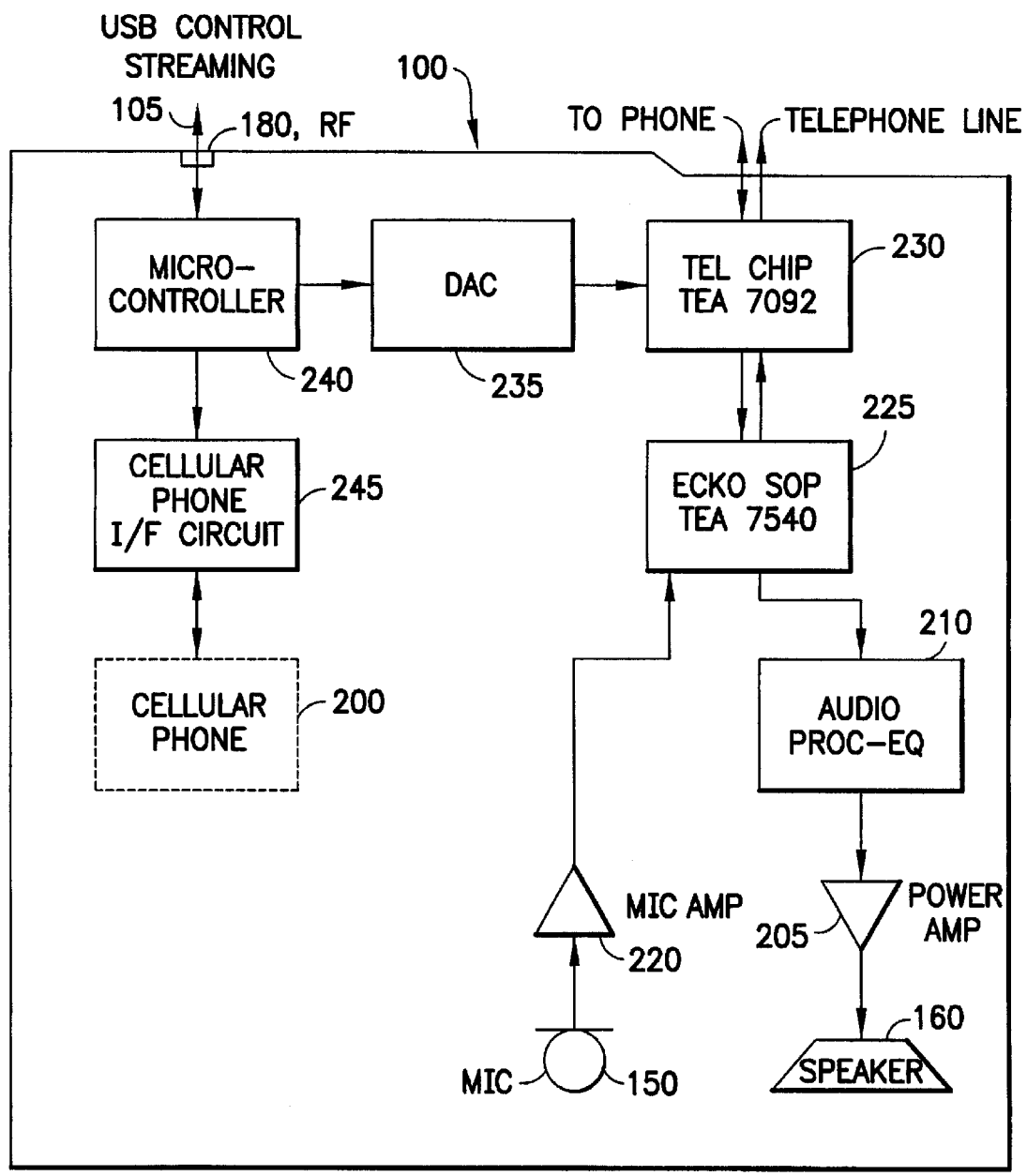
FIG. 2 shows an illustrative block diagram of the circuitry of the present invention.

A top view of one embodiment of the accessory device of the invention is depicted in FIG. 1. The accessory device includes a housing 110 onto which a cradle 140 is attached. The cradle 140 serves as a bi-directional interface for a cellular telephone. In one preferred embodiment, the cradle 140 has hot-sync capability. In another preferred embodiment, the cradle 140 is attachable/detachable so that different cradles for different brands of telephones may be attached and removed. One commonly used brand of cellular telephone that has a data interface is the Nokia 6160. The housing also contains internal circuitry interconnecting the various elements of the device. A block diagram of the circuitry is depicted in FIG. 2, described below.

Figure 1A:
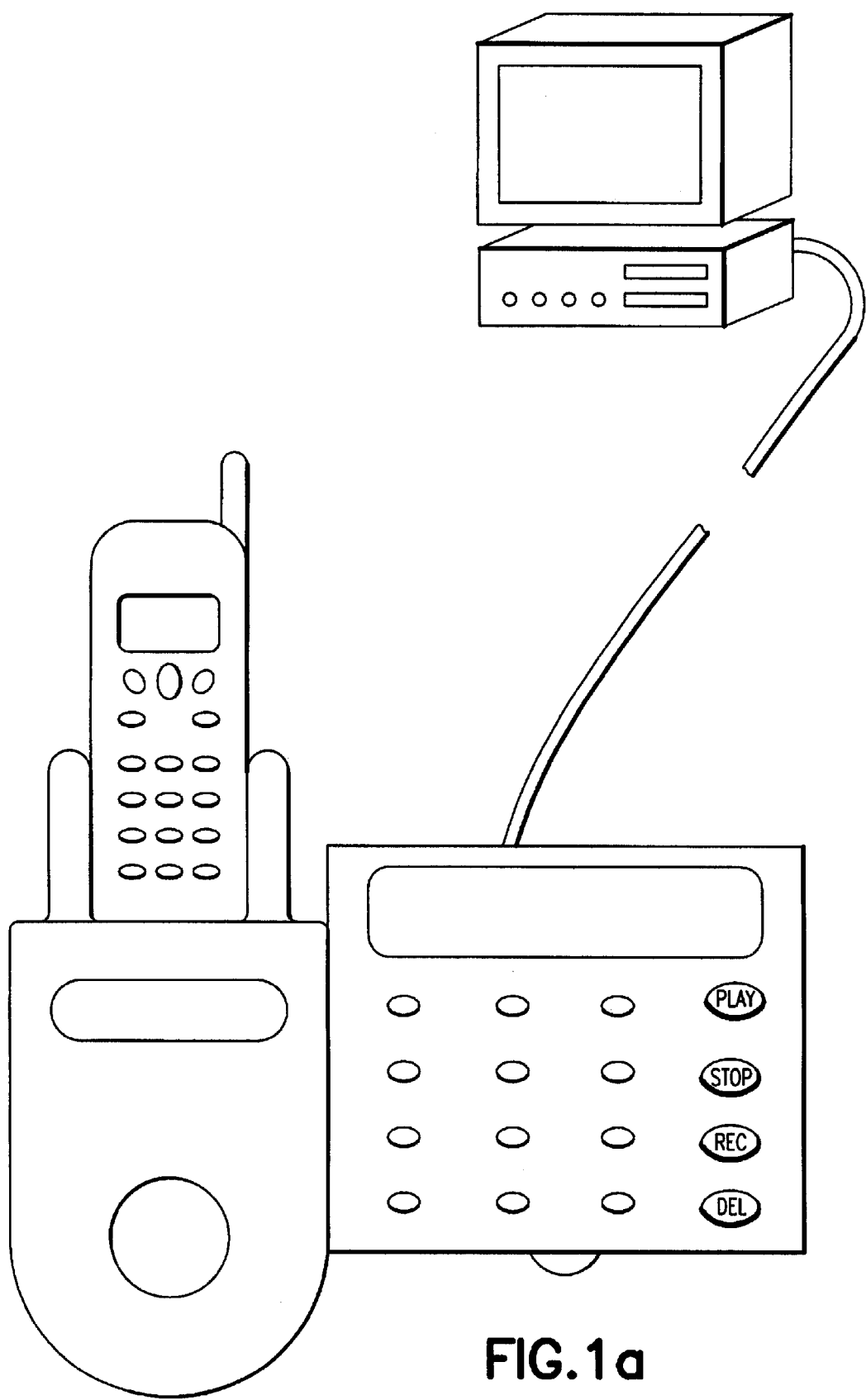
FIG. 1a shows a view of one embodiment of the accessory device of the present invention with a cellular telephone attached.

FIG. 1a depicts this embodiment of the invention with cellular phone 200 attached to the cradle 140, and illustrates the relationship of the housing 110 of the device with host computer 100. The host computer 100 to which the accessory device is connected via a USB cable 171 can be any type of personal computer, including those machines based on Intel's Pentium processor or similar CPU running Microsoft Windows, Apple's Macintosh, a Unix-based workstation, or even a mainframe. The computer 100 is preferably equipped with a sound board with an attached digital signal processor for the processing of audio signals. The host computer 100 is provided with software to process signals received from the accessory device, to control the device's functionality, and to upload a voicemail list back to the cellular telephone 200 via the USB cable, the internal circuitry of the accessory device and the cradle 140. In a preferred embodiment, the software includes a speech recognition component that can recognize spoken voice commands and convert these commands into text strings processible by the software. Speech recognition technology is well known in the art.

In a preferred embodiment, the cable 171 connecting the housing 110 of the accessory device to computer 100 is identical to that used for the Audio Accessory Device, provisional patent application No. 60/165325 filed on Nov. 12, 1999 by Tommyca Freadman, incorporated herein by reference. The cable includes audio-in and audio-out components for connection to the sound board. A USB cable without the audio connections can of course be used.

Referring back to FIG. 1, housing 110 includes a telephone keypad 130, further including control keys 131, 132, 133, 134, to support the device's play, record, stop, and delete functions, respectively. This list of keys is illustrative, and more or fewer keys can be used, depending upon the embodiment. The keys 130 can be electromechanical switches, membrane switches or any similar type of transducer known to those skilled in the art. Depressing one of the keys 130 transmits a signal via the internal circuitry of housing 110 and the USB cable to the software resident on computer 100, which then takes the appropriate action. Above the telephone keys 130 is a display screen 175. In addition, a depressible rotary dial 120 is mounted on the top face of housing 110. Rotary dial 120 is capable of selecting between various options displayed on the either the display area of cellular phone 200, display screen 175 or the host computer's monitor and transmitting a selection signal via the internal circuitry of housing 110 and the USB cable to the software provided for host computer 100, and to the attached cellular phone 200 via the interface of the cradle 140.

Other components mounted within housing 110 include a rotary volume control knob 135, speaker 160, microphone 150, and a USB connection means 170 for connection to a USB cable connecting the accessory device to the host computer 100. In a preferred embodiment, computer 100 is equipped with a modem for connection to a land-based telephone line. Telephone signals are transmitted from the telephone keys 130 of the housing 110 to the host computer 100 via the USB cable 171. In another embodiment, the housing includes a power connection 190 to enable recharging of the cellular telephone 200 when attached to the cradle 140. In an alternative embodiment, the housing 110 includes both a power connection and a land-based telephone connection so that the device can operate independent of the host computer 100. In another embodiment, the apparatus includes auxiliary audio input and audio output connections 151, 152, 153 so that separate microphones, speakers, or headphones may be used. In this embodiment, buttons 156, 157 are provided to selectively mute the microphone 150 and speaker 160 mounted within housing 110.

When the cellular phone 200 is detached from its cradle 140, the accessory device and its supporting software acts as a land based speaker telephone and answering machine system, since it has its own telephone connection. In conjunction with the caller identification service, the accessory device keeps a voicemail list of all incoming calls. When the accessory device receives an incoming call, a signal is transmitted to the software resident in computer 100. The signal includes information such as the phone number and name of the caller, the time of the call, and any messages left by the caller. The software saves this information to the voicemail list maintained in a mass storage device, such as the hard drive of the host computer 100.

When the cellular phone 200 is re-attached to the cradle 140, a signal is transmitted via the bidirectional interface of cradle 140, the internal circuitry of the accessory device and the USB cable to the software in computer 100, instructing the software to upload this list to the phone 100 so that the list can be displayed on cellular phone's display area. In addition, the software initiates a connection to the voicemail service of cellular phone 200 so the contents of that list can be transmitted and uploaded to the cellular phone 200. The voicemail list can also be displayed on the device's display screen 175 or on a monitor attached to computer 100. In addition, the phone number and name of an incoming call received either on the land-based telephone line or the cellular phone 200 can be displayed in the cellular phone's display area, display screen 175, or the monitor of computer 100. If an incoming call is unanswered while the telephone 200 is attached to the cradle 140, the caller information will be added to the voicemail list.

Once the voicemail list has been uploaded to the cellular phone 200, the rotary dial 120 can be used to scroll through the list. Rotating dial 120 transmits a signal via the interface of cradle 140 to cellular phone 200 instructing it to move the highlight through the displayed voicemail list. Once a voicemail message has highlighted, the message can be played by pressing the play button 131 on the telephone keypad 130, and the playback can be terminated by pressing the stop button 133. In an alternative embodiment, the user can depress the rotary dial 140 to both start and stop the message playback. The volume of the playback can be adjusted with volume control knob 135. A highlighted message can be deleted from the voicemail list by depressing the delete button 134.

An outgoing call can be made with or without the cellular phone 200 in the cradle 140. In either case, the accessory device, with or without the cellular phone 200 being attached, functions as a full duplex speaker telephone, with the accessory device's microphone 150 and speaker 160 substituting for those of the cellular phone 200. If the phone 200 is in the cradle 140, the accessory device places the call through the cellular phone 200. If the cellular phone 100 is not in the cradle 140, the call is placed through the land-based connection 170. In addition, if the cellular phone 200 is in the cradle 140, the voicemail list will appear on the cell phone's display. Otherwise, the list will appear in the device's display screen 175 or in a window on the host computer's 100 monitor. The rotary dial 120 can be rotated to move a highlight through the phone list. Once the user has highlighted the desired recipient of the call, the user presses the rotary dial 120 to initiate the call.

Another method of initiating a phone call is for the user to vocalize a command to call the name or number of the desired party into the microphone 150. The microphone 150 of the accessory device converts the sounds into electronic audio signals and transmits the signals via the USB cable to the software on computer 100. The speech recognition component of the software will convert the audio signals into a data stream recognizable by the software associated with the device so that the software can select the callee from the voicemail list and initiate the call. A third method of placing a phone call is for the user to key in the phone number on the telephone keypad 130 and then pressing rotary dial 120 to initiate the call. When the attached cellular phone 200 is in operation, the user may detach it and speak into the phone 200 directly. To terminate, the user presses the rotary dial 120 again.

The present invention in the embodiment described above can also be used to manage a conference call between the cellular phone connection and either another cellular phone connection or the land phone connection. To do this, the user first initiates an outgoing call as described above. Once the first call is initiated, a second call can be initiated in the same manner. In addition, the user can initiate a conference call upon receipt of an incoming call on either the cellular phone or the land-based phone by initiating an outgoing call as described above.

The accessory device can be used to record and play back voice messages. These recorded messages can be saved as files themselves to be replayed at a future data, or can be attached to other documents, such as email. The method and functionality for recording, saving, attaching and replaying messages is identical to that of the Audio Accessory Device, provisional patent application No. 60/165325 filed on Nov. 12, 1999 by Tommyca Freadman, previously incorporated herein by reference. Included with this functionality is the automatic adjustment of record and play back volume levels by the software executing on host computer 100, as described in the Audio Accessory Device provisional patent application. This software embeds the volume information in the file header of the file into which the recording is saved.

Alternatively, the speech recognition component of the software provided with the invention can recognize spoken voice commands in lieu of the user pressing a button on the housing 110 of the device. Once again, the microphone 150 converts the sounds into signals and transmits the signals via the USB cable to the software in computer 100.

One application of saving a recorded file is to add a task to a to-do list. Once the user has finished recording a task, the user presses the rotary dial, which transmits a signal to the software in computer 100, to bring up the audio file directory dialog box and selects the to-do list option. The speech recognition component of the software executing on computer 100 converts the spoken message into a text string and adds that string to the to-do list. In an alternative embodiment, a task key can be included with keypad 130. Pressing this key transmits a signal to the software in computer 100, which converts the recorded message to text, adds it to the to-do list. To display the task list in the embodiment described above, the user presses the task button on the apparatus. The list is displayed in the display of the phone 200, if the phone 200 is attached. If the phone 200 is not attached, the list is displayed in a window on the host computer. Alternatively, once the list has been displayed, a user can record a message as previously described, and when complete press the rotary dial, which transmits a signal to the software in computer 100, to attach that message to the list. The user can specify a future date when the message should be replayed in the future. The method by which a future playback date is specified is described in the Audio Accessory Device provisional patent application. The message will be replayed over the apparatus's speaker on the specified date and time.

An illustrative block-level diagram of the circuitry of a preferred embodiment of the present invention is shown in FIG. 2. Included within the housing 110 of the accessory device is the following: a micro-controller 240; a USB connection 180 that connects to the host computer's USB connection via USB cable 105; a digital-to-analog converter 235; a cellular phone interface circuit 245 that connects to cellular phone 200; a telephone chip 230 that connects to an incoming land-based telephone line, and to an outgoing line that connects to a telephone (not pictured); an echo suppression chip 225, which receives audio input from microphone 150 via amplifier 220, and which sends audio output to speaker 160 via the audio processor-equalizer chip 210 and power amplifier 205.

While the invention has been described in conjunction with preferred embodiments, it is evident that numerous alternative modifications, variations and uses will be apparent to those skilled in the art in light of the foregoing description.

What is claimed is:

1. A device for interfacing a computer to a cellular telephone, wherein said cellular telephone includes memory, voicemail, caller identification and a display screen, said device comprising:

a housing accessible, said housing comprising a cellular telephone interface adapted to transfer signals to and from the cellular telephone, and a telephone connection to connect to a land-based telephone line; and means for uploading the voicemail of said cellular telephone via the telephone connection and telephone interface to the memory of the cellular telephone, wherein attaching said cellular telephone to said telephone interface actuates the uploading of the voicemail of said cellular telephone to the memory of the cellular telephone from the computer for display in the display screen of said cellular telephone.

2. The device of claim 1, wherein said housing includes an audio input means and audio output means for input and output of audio information to and from said cellular telephone in full duplex mode, a selection means for selecting a call to callback from said voicemail displayed in the display screen of said cellular telephone, and a plurality of manually actuatable keys.

3. The device of claim 2 wherein said keys include voicemail control keys.

4. The device of claim 2 wherein said keys include telephone keys for dialing an outgoing telephone call.

5. The device of claim 1 further comprising computer connection means to connect the housing to a computer, wherein said means for uploading voicemail is a program executing on said computer.

6. The device of claim 1 wherein the uploading means is further adapted to display in the display screen of said cellular telephone a caller name and phone number of an incoming telephone call.

7. The device of claim 5 wherein said computer connection means is a connector for a universal serial bus cable.

8. The device of claim 2 wherein the selection means comprises a depressible rotary dial.

9. The device of claim 1 further comprising means for creating and attaching voice messages to electronic documents.

10. The device of claim 1, further comprising means for converting incoming voice signals into commands for initiating outgoing telephone calls, and for converting said voice signals into text strings to be added to an electronic document.

11. The device of claim 1 wherein the telephone interface is detachable from said housing.

12. A method for interfacing a cellular telephone to a computer, wherein said cellular telephone includes memory, voicemail, caller identification and a display screen, said method comprising the steps of:

maintaining on a computer a voicemail list of incoming telephone calls, said list including a name and telephone number for each caller;

attaching said cellular telephone to a telephone interface;

actuating an uploading of the voicemail from the computer to the memory of the cellular telephone; and displaying in the display screen of the cellular telephone the contents of the voicemail.

13. The method of claim 12 whereby a caller name and phone number of an incoming telephone call is displayed in the display screen of said cellular telephone.

14. The method of claim 12 further comprising the step of initiating a first outgoing telephone call by selecting a caller from the voicemail list displayed in the display screen of the cellular telephone.

15. The method of claim 14 further comprising the step of initiating a second outgoing telephone call by selecting a caller from the voicemail list displayed in the display screen of the cellular telephone after initiating said first outgoing telephone call so as to initiate a conference call.

16. The method of claim 12 further comprising the steps of:

answering an incoming telephone call; and initiating an outgoing telephone call after answering said incoming telephone call by selecting a caller from the voicemail list displayed in the display screen of the cellular telephone so as to initiate a conference call.

* * * * *